United States Patent
Fanning et al.

(10) Patent No.: US 9,652,259 B2
(45) Date of Patent: May 16, 2017

(54) APPARATUS AND METHOD FOR MANAGING REGISTER INFORMATION IN A PROCESSING SYSTEM (75) Inventors: Blaise Fanning, Folsom, CA (US); Anil K. Sabbavarapu, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 194 days.

(21) Appl. No.: 14/008,196

(22) PCT Filed: Oct. 1, 2011

(86) PCT No.: PCT/US2011/054496
§ 371 (c)(1),
(2), (4) Date: Dec. 16, 2013

(87) PCT Pub. No.: WO2013/048536
PCT Pub. Date: Apr. 4, 2013

(65) Prior Publication Data
US 2014/0095859 A1    Apr. 3, 2014

(51) Int. Cl.
*G06F 9/445* (2006.01)
*G06F 11/14* (2006.01)
(52) U.S. Cl.
CPC ...... *G06F 9/44505* (2013.01); *G06F 11/1441* (2013.01); *Y02B 60/185* (2013.01)
(58) Field of Classification Search
None
See application file for complete search history.

(56) References Cited

U.S. PATENT DOCUMENTS

| 5,754,762 | A | * | 5/1998 | Kuo et al. ............... 726/23 |
| 5,974,512 | A | * | 10/1999 | Chiba ............... 711/162 |
| 7,454,639 | B2 | | 11/2008 | Jain et al. |
| 7,631,210 | B2 | * | 12/2009 | Mahrla ............ G06F 11/3636 713/340 |
| 7,707,629 | B2 | | 4/2010 | Grawrock |
| 8,762,692 | B2 | * | 6/2014 | Schuchman et al. ....... 712/228 |

(Continued)

FOREIGN PATENT DOCUMENTS

CN    101268432    9/2008
WO    2013/048536 A1    4/2013

OTHER PUBLICATIONS

International Search Report dated May 4, 2012 for corresponding Application No. PCT/US2011/054496.
(Continued)

*Primary Examiner* — Paul Yanchus, III
*Assistant Examiner* — Paul J Yen
(74) *Attorney, Agent, or Firm* — KED & Associates LLP (57) ABSTRACT The setting in a configuration register is controlled based on a value stored in a management register and/or based on generation of a reset signal during a debugging operation or detection of a malfunction or power state transition in an electronic system. The management register may allocate a single bit to each configuration register, and the setting to be loaded into the configuration register is to be controlled based on the value of the bit. Additionally, or alternatively, the setting in the configuration register may be controlled when the reset signal assumes a value indicating that a default setting is to be stored.

23 Claims, 8 Drawing Sheets (56) References Cited

U.S. PATENT DOCUMENTS

| | | |
|---|---|---|
| 2007/0005998 A1 | 1/2007 | Jain et al. |
| 2007/0074059 A1 | 3/2007 | Abernathy et al. |
| 2007/0157042 A1* | 7/2007 | Jahagirdar et al. .......... 713/320 |
| 2009/0089562 A1* | 4/2009 | Schuchman .......... G06F 1/3203 712/228 |
| 2009/0292892 A1 | 11/2009 | Abernathy et al. |
| 2011/0179295 A1 | 7/2011 | Jahagirdar et al. |

OTHER PUBLICATIONS

International Preliminary Report on Patentability and Written Opinion received for PCT Patent Application No. PCT/US2011/054496, mailed on Apr. 10, 2014, 6 pages.
Chinese Office Action for Application 201180074443X dated Jul. 8, 2016 (full Chinese text).

* cited by examiner

APPARATUS AND METHOD FOR MANAGING REGISTER INFORMATION IN A PROCESSING SYSTEM

CROSS-REFERENCE TO RELATED PATENT APPLICATION

This application is a U.S. National Stage Application under 35 U.S.C. §371 of PCT Application No. PCT/US2011/054496, filed Oct. 1, 2011.

FIELD

One or more embodiments described herein relate to processing system control.

BACKGROUND

At certain times during operation of a processing system, events take place which necessitate the performance of a power-down procedure or other form of state transition. Recovering and/or re-activating the system takes time and unnecessary processing overhead is often expended. Also, during a state transition or power-down, information is often redundantly stored which causes the system to operate inefficiently.

DETAILED DESCRIPTION

Figure 1:
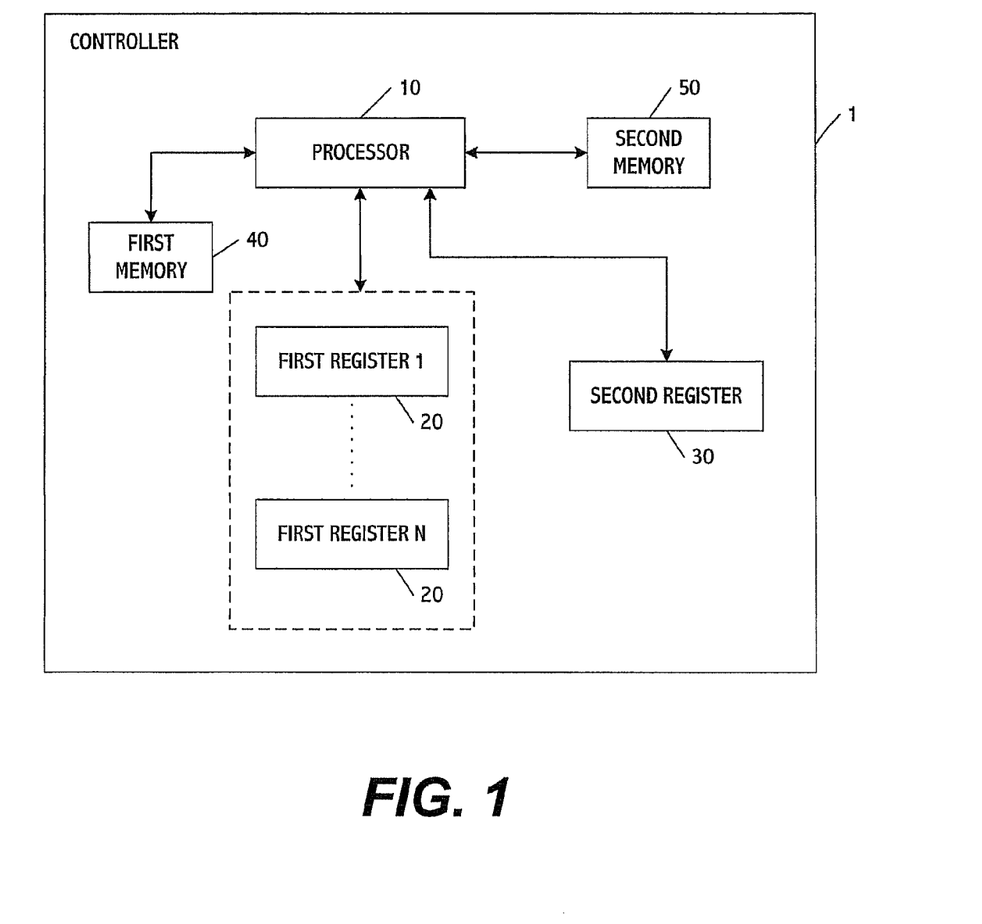
FIG. 1 shows one embodiment of a controller for an electronic system.

FIG. 1 shows a controller 1 for an electronic system, which may be any one of a variety of portable or stationary systems. Examples of portable systems include a mobile terminal such as a smart phone, pad- or pod-type device, media player, laptop or notebook computer, camera, internet terminal, a wireless router or hub, a portable hard drive, just to name a few. Examples of stationary systems include desktop computers, televisions and monitors, and video players.

The controller includes a processor 10, one or more first registers 20, a second register 30, a first memory 40, and a second memory 50.

The processor 10 controls various operations based on operating system and/or other control software stored in memory. The operations to be performed depend on, for example, the functionality of the system. In accordance with one embodiment, the control processor might be a central processing unit (CPU). In other embodiments, the processor may refer to a plurality of control circuits or software modules that control different operations of the system. In one application, the processor is included in a system-on-chip (SOC) for controlling the Basic Input/Output System, memory functions, arithmetic-logic functions, and/or other functions necessary to support operation of the system. One example of an SOC control processor is Intel's 8051 or ARM processor, where ARM stands for advanced reduced instruction set computer machine.

Each first register 20 may store a setting or other information for controlling performance of an associated function. The function may be related to a software program or module, a circuit, peripheral or sub-system, or even a certain platform of the electronic system. Examples include one or more settings for the system BIOS, a running application program, an Internet or other network connection or control function, an update or other software or operating system function, a media player, a program associated with a system start-up control, or another function, operation, or system program.

In one embodiment, the first registers may be considered to store a configuration of any of the entities described above and therefore may be referred to as configuration registers. Also, while N registers are shown in FIG. 1, in other embodiments the system may include only one configuration register. Also, in another embodiment to be described in greater detail, the first registers may be grouped into sets and storage operates may be performed on a set-by-set basis, instead of a register-by-register basis.

Figure 2:
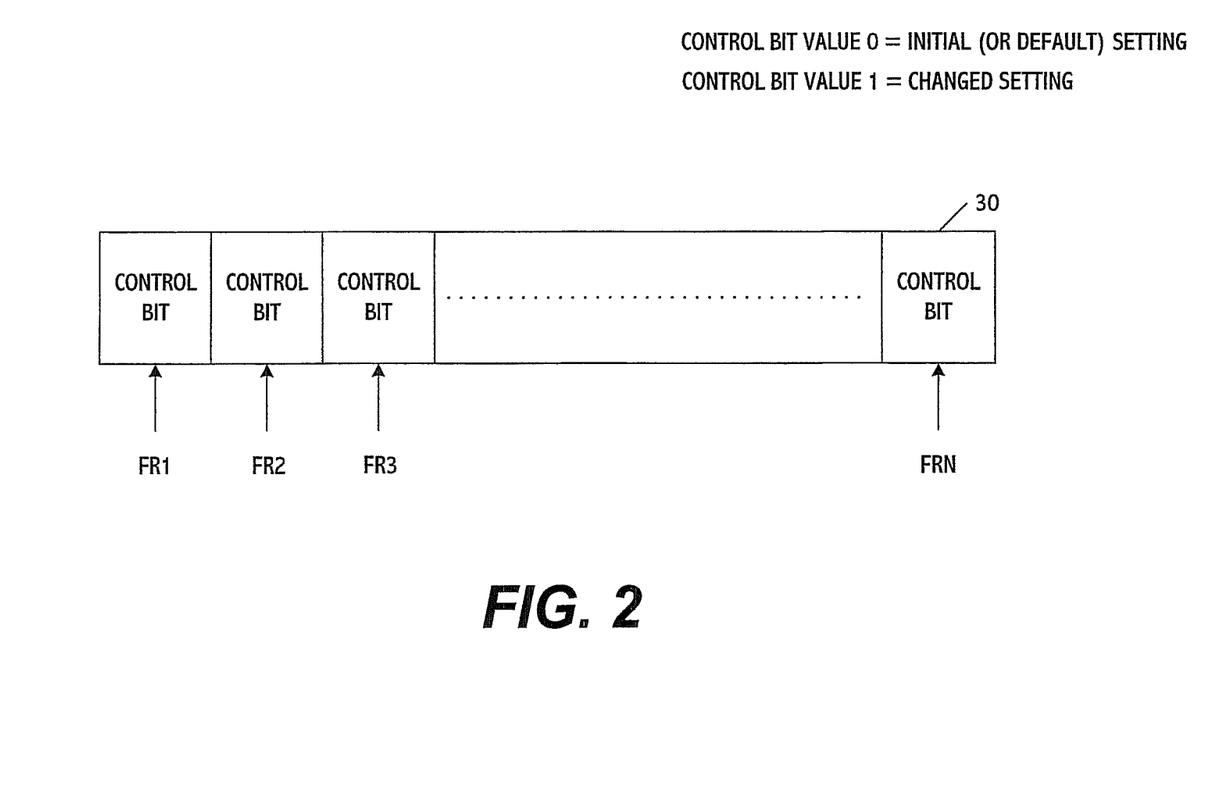
FIG. 2 shows a second (management) register to control the storage of setting information for one or more first (configuration) registers.

The second register 30 includes for storing information corresponding to the first registers. In accordance with one embodiment, the second register includes a plurality of bits for storing status information for respective ones of the first registers. For example, as shown in FIG. 2, a first bit 31 stores a logical value providing an indication of the status of first register 1, abbreviated FR1. A second bit 32 stores a logical value providing an indication of the status of first register 2 (FR2), and additional bits are provided for storing logical values for remaining ones of the first registers, FR3, . . . , FRN.

In one embodiment, the logical value in each bit position of the second register provides an indication of whether a setting stored in a corresponding one of the first registers has been updated since a reference point in time. The reference point in time may be a time when the system was initially powered on, a time when the system was booted or rebooted, a time when a certain application was called for execution in the system, a time when an operation was initiated for a certain sub-system or platform, or another time.

The update of a setting stored in one of the first registers may be in the form of the processor storing different setting in that register since the reference time. Storing a different setting (e.g., bit value(s)) in a first register may indicate that a corresponding function has been changed in some way, e.g., either that function has be called for execution or has otherwise been changed during operation of the host system.

When a new setting has been written into one of the first registers, the processor may store a predetermined logical value in a corresponding bit position of the second register, to reflect the status change. The change, for example, may involve changing writing a new setting in the first register to replace a default or initial value. When this occurs, the processor may store a logical 1 value in a corresponding bit position of the second register.

Bit positions in the second register are assigned a logical 0 value when the settings in respective ones of the first registers have not been overwritten or otherwise changed from their initial or default settings. In this way, the second register may therefore be considered as a configuration management register. In other embodiments, more than one bit in the second register may be assigned to different ones of the first (configuration) registers, and/or the second (management) register may include additional bits or fields for storing other types of information with the status information.

The first memory 40 may store initial settings or default values for the functions that correspond to respective ones of the first registers. The first memory may be coupled to the processor, or the first registers directly, to allow for resetting of the first registers at power-up, booting, or at a subsequent time or condition.

The second memory 50 may store the changed or overwritten settings for the first registers that correspond to a logical 1 value in the second register. In one embodiment, the second memory only stores the settings for the first registers that have been changed or overwritten. The settings in the other registers (i.e., ones retaining their initial or default values) are not stored in the second memory. By only storing the setting information for the first registers that have been written with new values since the reference time, the amount of data to be stored in the second memory can be significantly reduced.

Figure 3:
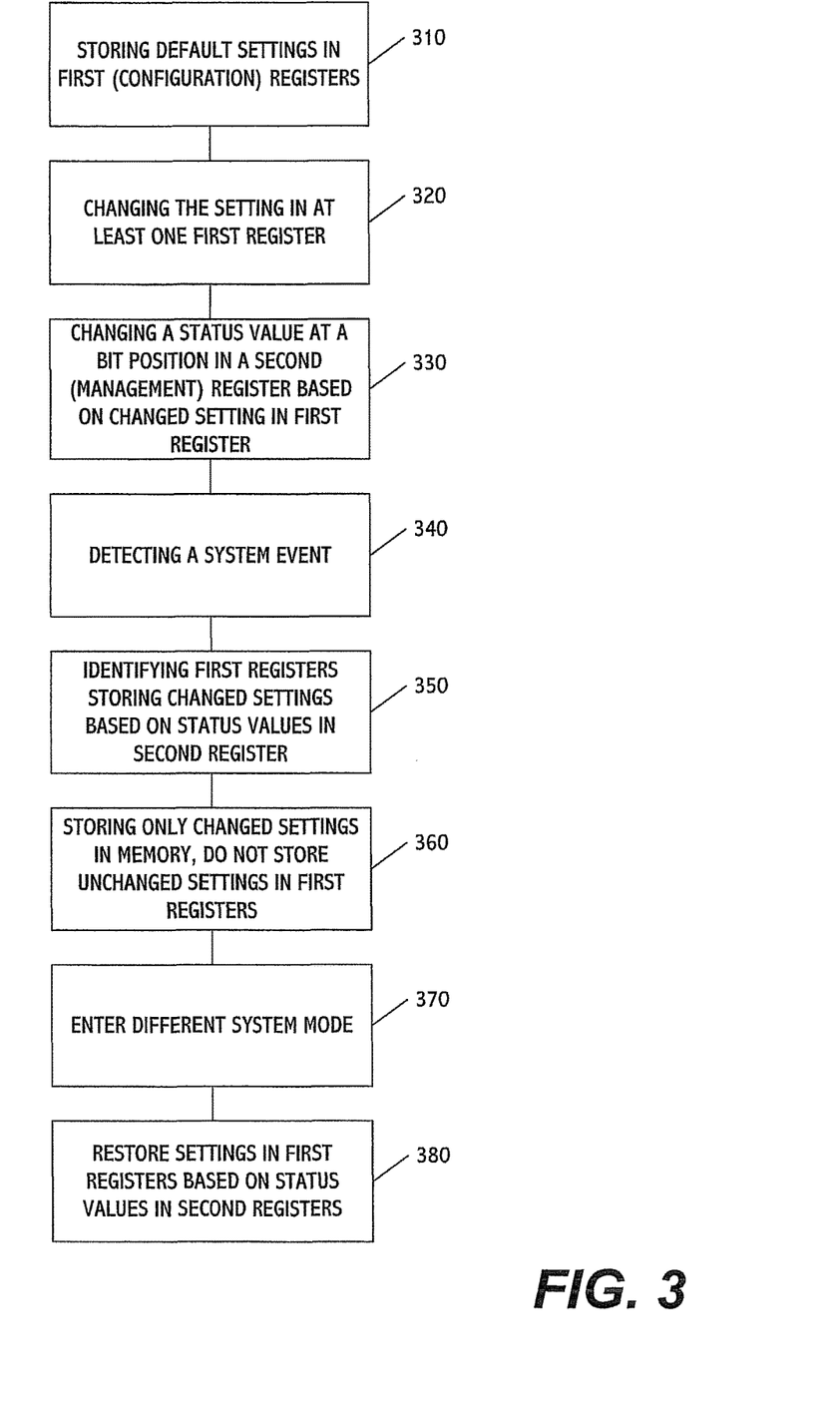
FIG. 3 shows one embodiment of a method for controlling an electronic system.

FIG. 3 shows operations included in one embodiment of a method for controlling an electronic system. The system may be the one described with reference to FIG. 1 or another system, and the first and second registers may be the ones described above. The method may be performed after several preliminary operations have been performed in the system.

These preliminary operations may include a power-on or booting procedure. At power-on or booting, default settings are stored in the first (configuration) registers for corresponding functions of the system. (Block 310). In accordance with one embodiment, the default settings are initial settings for corresponding system functions to be assumed at power-up or after another BIOS or operating-system function is performed. In other embodiments, the default setting may be one pre-programmed into the system by a manufacturer and/or user, for purposes of activating, deactivating, or otherwise controlling corresponding functions when a certain system event occurs.

After power-up, the system is controlled in a normal manner based on operating system, BIOS, or other control software and/or based on various operations performed by a user. During operation, a status in one or more functions corresponding to the first registers may be performed. This may involve, for example, a user initiating the execution of an application or other program. Additionally, or alternatively, the status of a system function may be changed based on a network connection or other type of network activity, performance of a control function by the processor, a communication function, a data transfer function or update, just to name a few.

When the status of a function changes (e.g., from its power-up status), a corresponding setting for the function may change. Another operation may, therefore, involve having the processor store the changed setting in a first register corresponding to the function. (Block 320). After this setting has been changed, the processor may change the initial value stored in the bit position of the second (management) register corresponding to function of the changed first register setting. (Block 330). The initial value may be a logical 0 value and the changed value may be a logical 1, signifying that the status of the function corresponding to the first register has changed.

Next, an event is detected by the processor. (Block 340). The event may be an interrupt, error or malfunction, recovery/restore, or change in power state of the system. In this latter case, the power state change may reflect the system going from a full-power state to a lower-power state, for example, implemented to save battery power or for screen-saver purposes. One specific example, includes detection of a low-latency state transition.

When such an event occurs, the operating system software may direct the processor to store the settings in the first registers, for example, in order to allow for system recovery or restoration to a given power or operational state. In accordance with one embodiment, only the settings in the first registers which have been changed after an initial reference time are stored in memory. This initial reference time may be system power-on, reboot, or a time when a certain application or control operation has been performed in the system, or a last time when a system recovery or restore operation was performed.

To implement these features, a next operation therefore involves detecting one or more first registers which contain changed settings from the reference time. (Block 350). This operation is performed based on the status values stored in the bit positions of the second (management) register. More specifically, the processor determines which bit positions have logical 1 values and then identifies which ones of the first registers correspond to these bit positions.

Only the settings (or other information) stored in the first registers that have corresponding logical 1 values are then stored in memory. (Block 360). This memory may, for example, be the second memory in FIG. 1. The settings in the first registers which have not been changed since the reference time are not stored in memory. This is because the settings stored in these first registers are default settings that are already stored in the system, e.g., in first memory 40 in FIG. 1. (In other embodiments, first and second memories 40 and 50 may be replaced with different storage areas in a same physical memory).

To store the settings in the unchanged first registers would cause the system to redundantly store the settings for the functions corresponding to the unchanged first registers. Instead of storing these settings, the second register stores a status value of logical 0 to guide subsequent operation of the processor.

After the changed settings have been stored, the system enters into a different mode operation depending on the type of event detected. (Block 370). For example, if the event involved a transition to a lower-power state, then power to system circuits is reduced to sustain operations in that state. If the event was the detection of a malfunction or error, then the processor may execute routines in an attempt to correct the error or malfunction. This may or may not involve a system power down. During this time, the status values in the second registers are retained, but the values in the first registers may be cleared or retained.

After the operation in Block 370 is performed, a recovery or restore operation is performed and/or the processor causes the system to resume the previous or another mode of operation. For example, if the event involved transitioning the system to a lower-power state, the processor may change operation of the system back to a higher-power state. Or, if a system error or malfunction was detected, the processor may attempt to change the system back to the operational state that existed just prior to the error or malfunction. Thus, for example, if one or more applications were running at this time, the system may attempt to automatically restart these applications.

In order to implement this level of control, the processor may cause the processor to restore the settings in the first registers. (Block 380). The settings are restored based on the status values stored in the second registers. This may involve the processor examining the status values in the second register on a bit-by-bit basis. The processor stores the default settings from the first memory into the first registers that have logical 0 status values at corresponding bit positions in the second register, and stores the changed settings from the second memory into the first registers that have logical 1 status values at corresponding bit positions in the second register.

These operations are automatically performed based on control software stored in the system. The control software may, for example, correspond to a save and/or restore routine to be executed.

Figure 4:
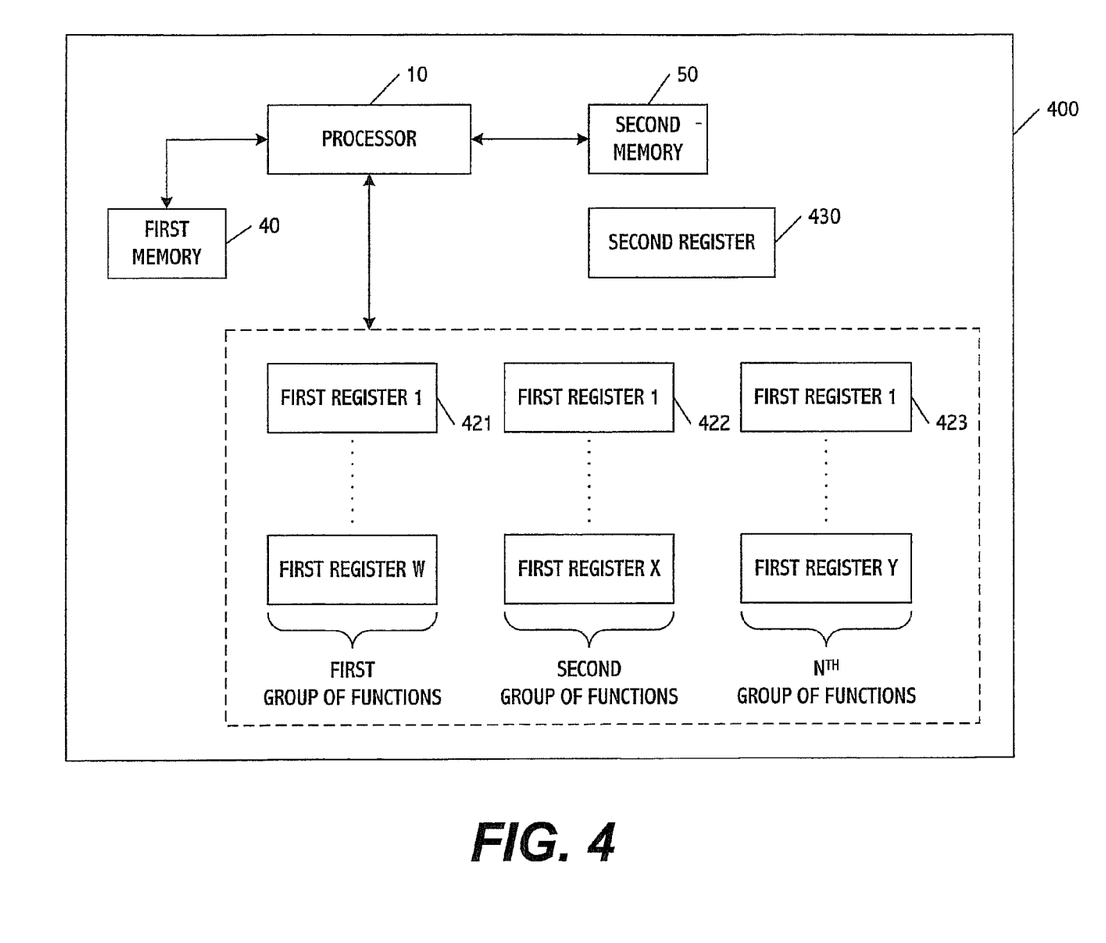
FIG. 4 shows another embodiment of a controller for an electronic system.

FIG. 4 shows another embodiment of a controller for an electronic system, which, for example, may be any of the electronic systems previously discussed. The embodiment may have some of the same features as the first embodiment and accordingly similar reference numerals have been used. The controller of FIG. 4, however, differs from the first embodiment in that the first (configuration) registers are allocated into different groups and that the first registers in each group are handled in the same way in terms of storing setting information.

In accordance with the example shown in FIG. 1, a first group of first registers 421 corresponds to a first set of functions of the electronic system. The functions may be ones that are related to a common application or control feature of the system, and thus are either inter-dependent or performed sequentially relative to one another. The second and subsequent groups have first registers that correspond to different functions that may relate to different applications or control features. Each group may include different numbers of first registers, e.g., W, X, and Y.

Figure 5:
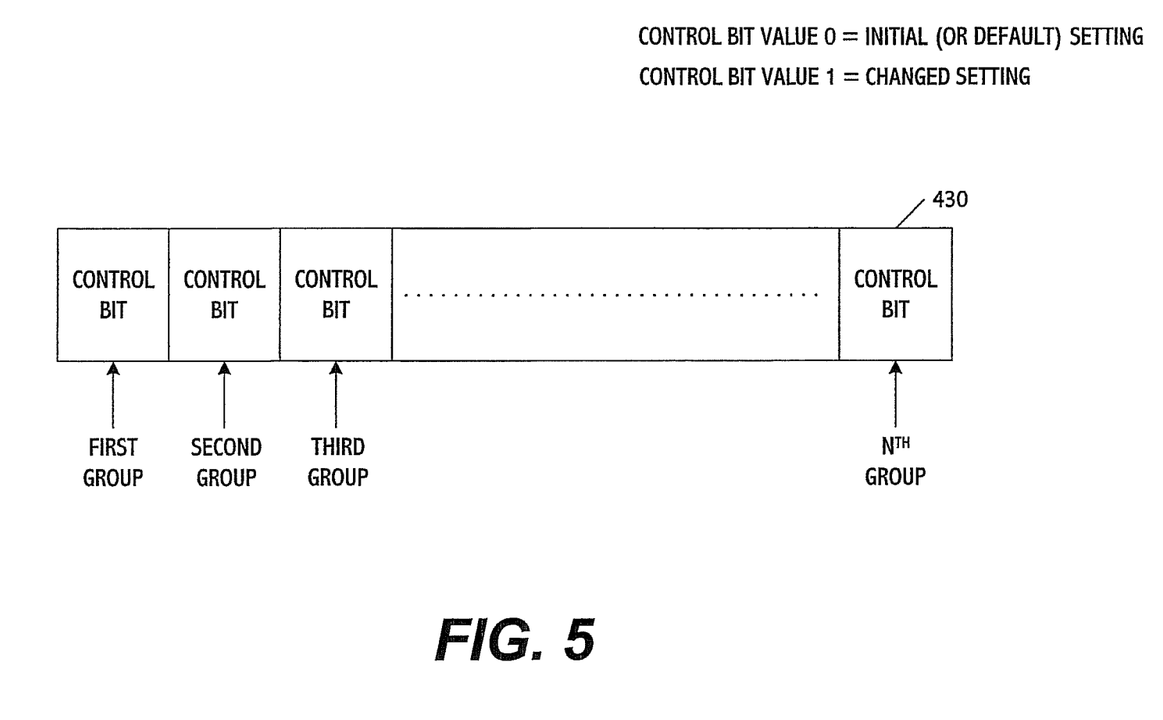
FIG. 5 shows a second (management) register to control the storage of setting information for a plurality of groups of first (configuration) registers.

FIG. 5 shows one example of how second register 430 may be configured for this embodiment. In this figure, the bit positions of the second register 430 are used to store status values for respective ones of a plurality of groups of first (configuration) registers. A first logical value (e.g., 0) may be stored in a bit position of the second (management) register when the settings for the first registers in a respective group has not changed, overwritten, or updated since a reference time.

A second logical value (e.g., 1) may be stored in bit positions of the second register when the settings for one or more of the first registers in respective ones of the groups has been changed, overwritten, or updated since a reference time. The reference time may be any of the times or conditions described for the previous embodiments.

Figure 6:
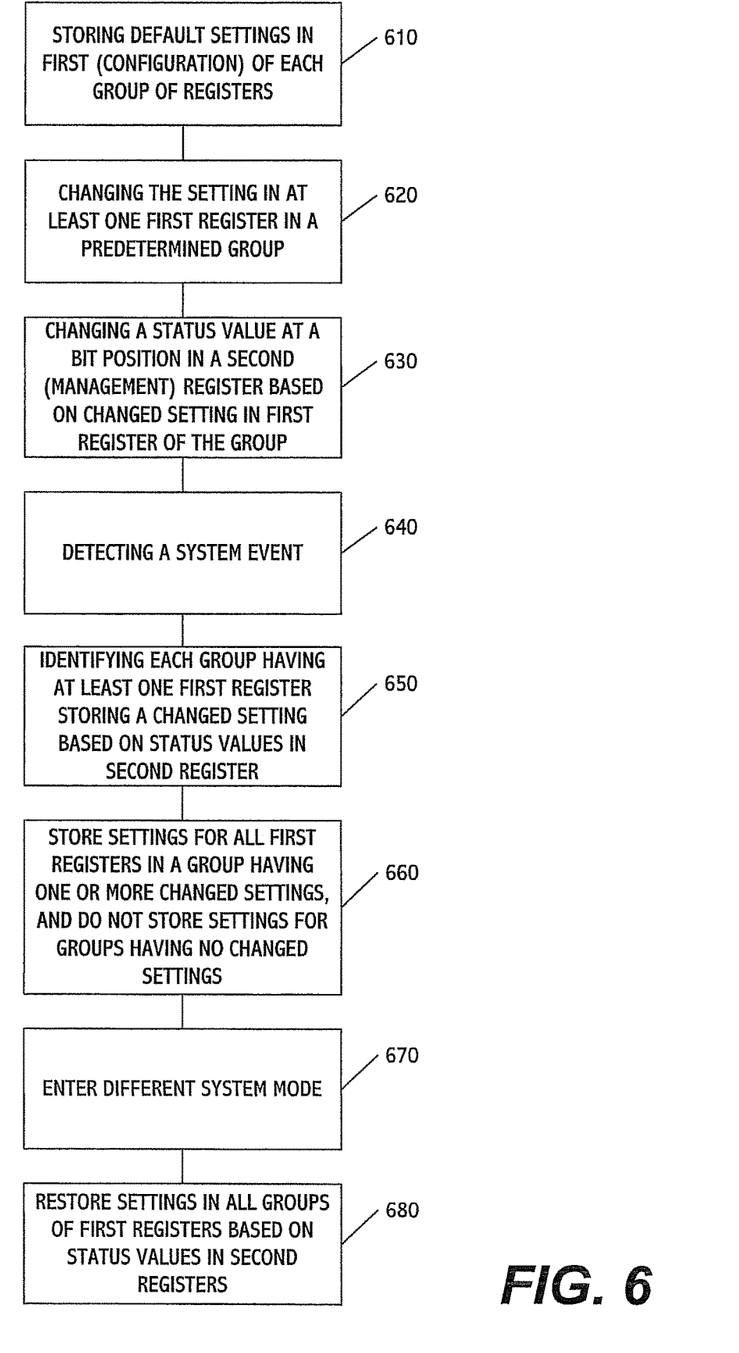
FIG. 6 shows another embodiment of a method for controlling a system.

FIG. 6 shows operations included in an embodiment of a method for controlling an electronic system based on the second register shown in FIG. 5. The method includes storing default settings in the first registers of each group of registers. (Block 610). In one illustrative application for a smart phone, the groups may include a total of 32 first (configuration) registers or more, and thus partitioning the registers into groups and then controlling storage of the register settings in groups may serve to increase the efficiency of operation of the phone.

When the setting in at least one first register in any group is changed (Block 620), the status value of the corresponding bit position in the second register for that group is changed (Block 630). The status value indicating a changed setting in the second register may be a first status value, e.g., logical 1. If none of the setting information in the first registers of any group is changed, then the bit position in the second register corresponding to this group is assigned or otherwise allowed to retain a second status value (e.g., logical 0). This value may have been set, for example, at power on.

When a malfunction occurs, a power state transition is to be performed, or another event is detected or scheduled (Block 640), the settings in the first registers of only those groups which have been assigned the first status value in the second register are identified (Block 650) and stored in the second memory (Block 660). This storing operation is performed even for the settings in the first registers in those groups which have not been changed. That is, as long as the setting information in at least one first register has been changed in any group, the setting information for all registers in that group are stored, even ones whose setting information have not changed.

On the other hand, the settings in the groups of first registers that correspond to the second status value are not stored in the second memory. This is because the default values already are stored in the first or another memory, and thus to store them again in the second memory would be redundant. The values in these first registers may optionally be cleared in order to allow for correction of the malfunction or to implement the power-state change.

After the malfunction has been corrected, another power state transition is to be performed, or another mode is to be entered (Block 670), the processor stores the settings back into the groups of first registers based on the status values stored in the second register (Block 680). The settings are output from the second memory for the first registers in groups that had at least one first register with a changed setting, i.e., for groups that have the first status value in corresponding bit positions of the second register. The settings are output from the first memory for groups having no first register with a changed setting, i.e., for groups that have the second status value in corresponding bit positions of the second register. Thus, operation of the electronic system may be recovered, restored, or otherwise placed in the previous or different power state.

In at least one of the aforementioned embodiments, the second (management) register allocates only one bit to each first (configuration) register or group of first registers. In other embodiments, more than one bit (e.g., a field of bits) may be allocated in the second register to respective first registers or groups of first registers. Also, the second register may be arranged to store additional information with the status values, in order to provide an additional measure of control when a system recovery, restore, power state transition or other event occurs or procedure is to be performed.

Figure 7:
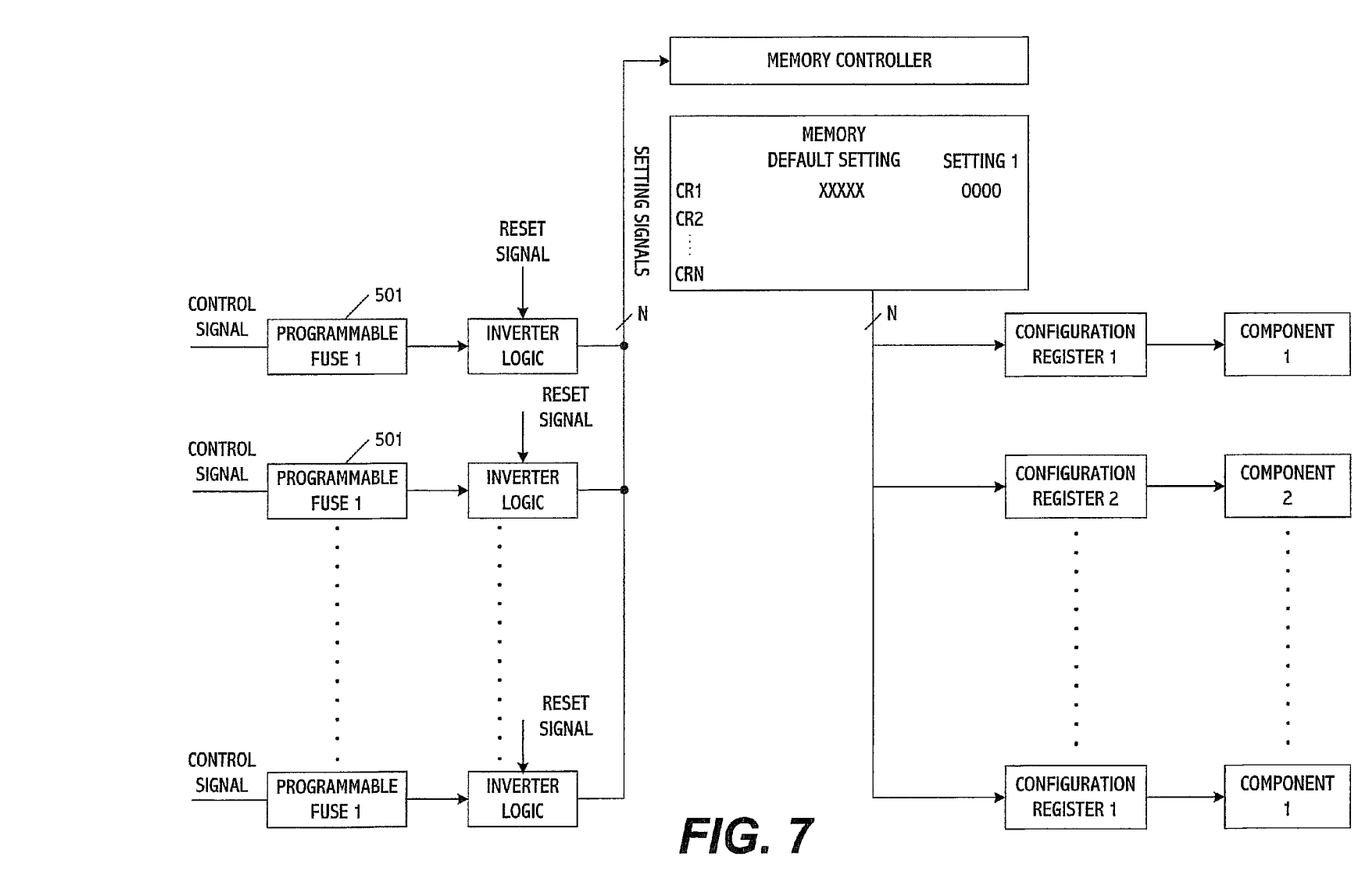
FIG. 7 shows an apparatus for controlling a setting for a configuration register.

FIG. 7 shows an apparatus for controlling configurations registers in an electronic system, which, for example, may be any of the systems previously described. The apparatus includes a plurality of programmable fuses 501 that are coupled to respective ones of a plurality of inverters 502. The inverters output control signals to a memory controller 503, which then causes a memory 504 to output a setting for storage into configuration registers 505. The setting stored in each register controls operation of a corresponding component 506 of the electronic system.

In operation, each programmable fuse receives a control signal, for example, from a system processor operating based on control software. The control signal may be generated at system power-on or reboot or when a malfunction is detected or a debugging operation is to be performed, for example, during initial manufacture testing. The control signal causes the fuse to "blow," causing it to output a logical 0 value.

A corresponding one of the inverters receives the logical zero value and compares it to the logical value of a reset signal. Based on these values, the inverter outputs a setting signal to the memory controller to indicate which setting is to be output to an associated one of the configuration registers. If the setting signal output from the inverter is a logical one, then the memory controller causes a default setting to be output to a corresponding one of the configuration registers.

If the setting signal from the inverter is a logical 0, then another setting (e.g., setting 1) may be output to the register. This latter case may occur, for example, during normal operation of the system when, for example, an application program is to be executed.

Based on the setting stored in the configuration register, one or more of the components are controlled. If a debugging procedure is being performed, the component may be analyzed by the system processor to determine whether there is proper operation.

Figure 8:
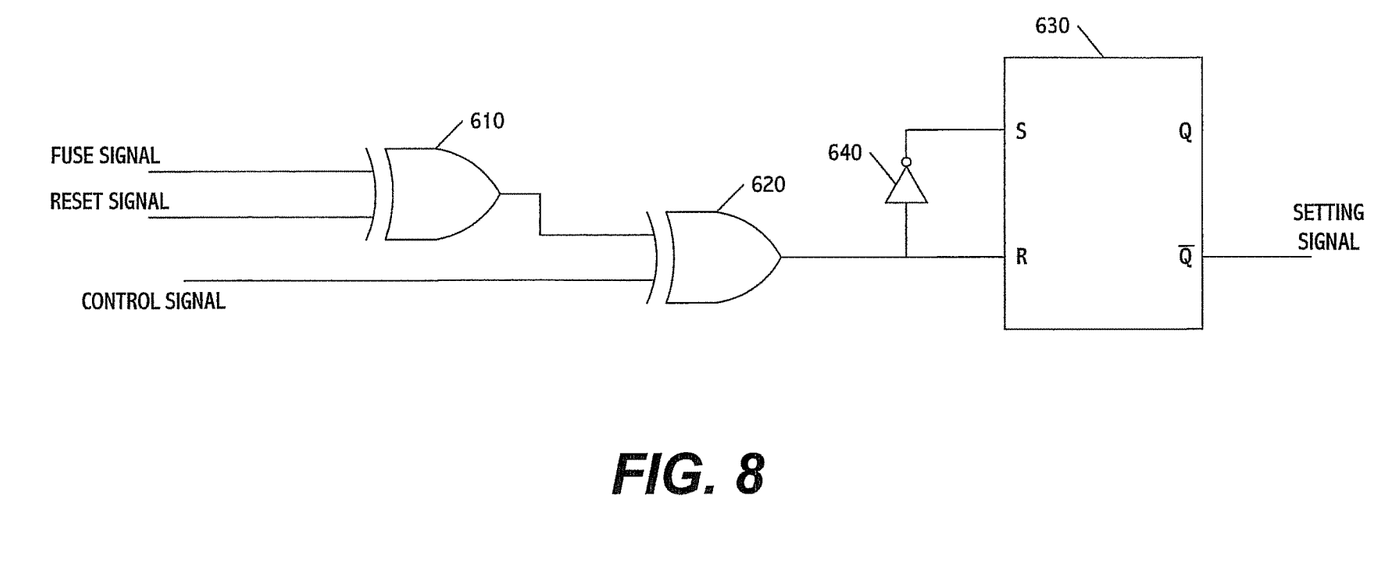
FIG. 8 shows an inverter which may be used in the apparatus of FIG. 7.

FIG. 8 shows one type of inverter that may be used in FIG. 7. In this example, the inverter includes a first XOR logic gate 610 coupled to a second XOR logic gate 620, the latter of which is coupled to a flip flop circuit 630. The fuse signal and reset signal serve as inputs of the first XOR gate, and the output of the first XOR gate and the control signal for the fuse serve as inputs of the second XOR gate. The output of the second XOR gate is coupled to the flip-flop, and the output of the flip-flop may serve as the setting signal to the memory controller.

In one embodiment, a set-reset (SR) flip-flop is used to output the setting signal. In this case, the output of the second XOR gate may be coupled to the reset (R) input of the flip-flop, and an inverter 640 may be included to invert the output from the second XOR gate for coupling to the set (S) input of the flip-flop. In other embodiments different logic gates and/or flip-flops may be used to generate the setting signal.

In operation, when the fuse signal is a logical 0 and the reset signal is a logical 1, the first XOR gate outputs a logical 1 value for input into the second XOR gate. The control signal has a logical 1 value at this time, which may be set, for example, at system power-on or reboot, when a malfunction is detected or a debugging operation is to be performed, or under other circumstances as determined by the operating system or other control software.

Based on the logical 1 values of the output of the first XOR gate and the control signal, the second XOR gate outputs a logical 0 value for input into the reset (R) input of the flip-flop. A logical 1 is input into the set (S) input. As a result, the complement signal from the Q\output is a logical zero, which causes the memory controller to output the pre-stored default setting for a corresponding one of the configuration registers.

During normal or other operational modes, the control signal into the fuse may have a logical 0 value, signifying that no malfunction, debugging, power-on, or reboot is to be performed. Under these circumstances, the fuse signal will have a logical 1 value and the reset signal will have a logical 0 value. The first XOR gate will therefore output a logical 1 value which is combined with the logical 0 value of the control signal to form a logical 1 output. The logical 1 output from the second XOR gate is coupled to the R input of the flip-flop and a logical 1 is coupled to the S input. As a result, the flip-flop outputs a setting value having a logical 1 value which indicates to the memory controller that another setting is to be loaded into the configuration register.

In the aforementioned embodiment, multiple configuration registers are shown with an equal number of fuses and inverters. In alternative embodiments, only one configuration register may be included with one fuse and one inverter for controlling the setting to be stored.

Any reference in this specification to an "embodiment" means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. The features of one embodiment may be combined with features of one or more of the other embodiments to form new embodiments.

Furthermore, for ease of understanding, certain functional blocks may have been delineated as separate blocks; however, these separately delineated blocks should not necessarily be construed as being in the order in which they are discussed or otherwise presented herein. For example, some blocks may be able to be performed in an alternative ordering, simultaneously, etc.

Although the present invention has been described herein with reference to a number of illustrative embodiments, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

We claim:

1. An apparatus comprising:
   a plurality of configuration registers including at least a first configuration register and a second configuration register, the first configuration register to store settings relating to a first function, and the second configuration register to store settings relating to a second function;
   a management register including a plurality of bits to store values for each of the plurality of configuration registers, wherein the plurality of bits includes at least a first bit and a second bit, the first bit of the management register to correspond to the first configuration register, and the second bit of the management register to correspond to the second configuration register; and
   logic to change a first setting of the first configuration register to a second setting of the first configuration register, to change a first value of the first bit of the management register to a second value based on the change of the first setting to the second setting of the first configuration register, and to store the second setting at a location different from the first configuration register based on a first event, the first event being a detection of a malfunction,
   the logic to change a third setting of the second configuration register to a fourth setting of the second configuration register, to change a first value of the second bit of the management register to a second value based on the change of the third setting to the fourth setting of the second configuration register, and to store the fourth setting at a location different from the second configuration register based on a second event, the second event being a detection of a malfunction, wherein the management register to store the first value for the first bit when the first setting has not been changed at the first configuration register since a reference time, and the management register to store the second value for the first bit when the first setting of the first configuration register change to the second setting since the reference time, wherein the first value of the first bit to indicate that the first setting of the first configuration register has not changed from the reference time, and the second value of the first bit to indicate that the first setting of the first configuration register has changed to the second setting since the reference time.

2. The apparatus of claim 1, wherein an operation to store the second value of the first bit is not initiated in a period between the reference time and occurrence of the first event.

3. The apparatus of claim 1, wherein the reference time is based on a system power on.

4. The apparatus of claim 1, wherein the reference time is based on previous performance of a system restore or recovery operation.

5. The apparatus of claim 1, wherein the first setting for the first configuration register and the third setting of the second configuration register are pre-stored in the system before the reference time.

6. The apparatus of claim 1, wherein the first setting for the first configuration register and the third setting for the third configuration register are deleted from the first configuration register and the second configuration register, respectively, after occurrence of the first event.

7. The apparatus of claim 1, wherein the second setting for the first configuration register is retrieved from a storage area that pre-stored the second setting before the reference time.

8. The apparatus of claim 1, wherein:
the first setting of the first configuration register is pre-stored in a first memory before the reference time, and
the second setting of the first configuration register is stored in a second memory different from the first memory after the reference time.

9. The apparatus of claim 1, wherein the first setting and the second setting of the first configuration register are stored separately in first and second memories, respectively.

10. The apparatus of claim 1, wherein the first value is set in a second register for a group of functions which include the first function, and wherein the setting value for at least one function in the group is not changed since the reference time.

11. The apparatus of claim 1, wherein the second value of the first bit indicates that setting of the first configuration register has been updated since the reference time.

12. The apparatus of claim 1, wherein the first setting of the first configuration register is a default value.

13. The apparatus of claim 1, wherein the logic to restore the settings in the first configuration register based on logic values of the first bit of the management register.

14. The apparatus of claim 1, comprising a first memory to store default values, and a second memory to store only settings that have changed since the reference time.

15. A non-transitory computer-readable medium to store a program for controlling information, the medium comprising:
first code to store a first setting relating to a first function in a first configuration register and to store a third setting relating to a second function in a second configuration register;
second code to change the first setting of the first configuration register to a second setting of the first configuration register, and to change the third setting of the second configuration register to a fourth setting of the second configuration register;
third code to change a first value of a first bit of a management register to a second value based on the change of the first setting to the second setting of the first configuration register, and to change a first value of a second bit of the management register to a second value based on the change of the third setting to the fourth setting of the second configuration register; and
fourth code to store the second setting at a location different from the first configuration register based on a first event, the first event being a detection of a malfunction,
wherein the management register to store the first value for the first bit when the first setting has not been changed at the first configuration register since a reference time, and the management register to store the second value for the first bit when the first setting of the first configuration register change to the second setting since the reference time of the first bit, wherein the first value of the first bit to indicate that the first setting of the first configuration register has not changed from the reference time, and the second value of the first bit to indicate that the first setting of the first configuration register has changed to the second setting since the reference time.

16. The medium of claim 15, wherein an operation to store the second value of the first bit is not initiated in a period between the reference time and occurrence of the first event.

17. The medium of claim 15, wherein the reference time is based on a system power on.

18. The medium of claim 15, wherein the reference time is based on previous performance of a system restore or recovery operation.

19. The medium of claim 15, wherein the first setting of the first configuration register and the third setting of the second configuration register is pre-stored in the system before the reference time.

20. A method for controlling information, comprising:
storing a first setting relating to a first function in a first configuration register;
storing a third setting relating to a second function in a second configuration register;
changing the first setting of the first configuration register to a second setting of the first configuration register;
changing the third setting of the second configuration register to a fourth setting of the second configuration register;
,changing a first value of a first bit of a management register to a second value based on the chat re of the first setting to the second setting of the first configuration register;
changing a first value of a second bit of the management register to a second value based on the change of the third setting to the fourth setting of the second configuration register storing the second setting at a location different from the first register based on a first event, the first event being a detection of a malfunction, wherein the management register to store the first value for the first bit when the first setting has not been changed at the first configuration register since a reference time, and the management register to store the second value for the first bit when the first setting of the first configuration register changes to the second setting since the reference time, wherein the first value of the first bit to indicate that the first setting of the first configuration register has not changed from the reference time, and the second value of the first bit to indicate that the first setting of the first configuration register has changed to the second setting since the reference time.

21. The method of claim 20, wherein an operation to store the second value of the first bit is not initiated in a period between the reference time and occurrence of the first event.

22. The method of claim 20, wherein the reference time is based on a system power on.

23. The method of claim 20, wherein the reference time is based on previous performance of a system restore or recovery operation.

* * * * *